Feb. 4, 1930. W. H. NOELTING ET AL Re. 17,578

FURNITURE TRIM AND KEEPER

Original Filed Feb. 2, 1926

INVENTORS,
ANDREW I. BROKAW.
WILLIAM H. NOELTING.

BY Lorkowski & Lorkowski
ATTORNEYS,

Reissued Feb. 4, 1930 Re. 17,578

UNITED STATES PATENT OFFICE

WILLIAM H. NOELTING, OF EVANSVILLE, INDIANA, AND ANDREW I. BROKAW, OF CINCINNATI, OHIO, ASSIGNORS TO FAULTLESS CASTER COMPANY, OF EVANSVILLE, INDIANA, A CORPORATION

FURNITURE TRIM AND KEEPER

Original No. 1,622,735, dated March 29, 1927, Serial No. 85,548, filed February 2, 1926. Application for reissue filed November 17, 1928. Serial No. 320,204.

This invention relates to a combination keeper and mounting for a furniture trim of the drawer pull type.

The chief object of this invention is to provide a combination keeper and mounting of a character whereby the same is adapted to simultaneously rigidly secure the ornamental face plate in position upon a support, and the handle or pull portion thereon by a combination keeper and mounting of but a minimum number of parts.

The chief feature of the invention consists in the accomplishment of the foregoing object in the formation of the combination keeper and mounting with its parts integral, and from sheet metal suitably formed into keeper and mounting formation.

Incidental features of the invention consist in the provision of suitable anchorages, suitable stops and ornamental reenforcements.

The full nature of the invention will be understood from the accompanying drawings and the following description and claims.

Figure 1:
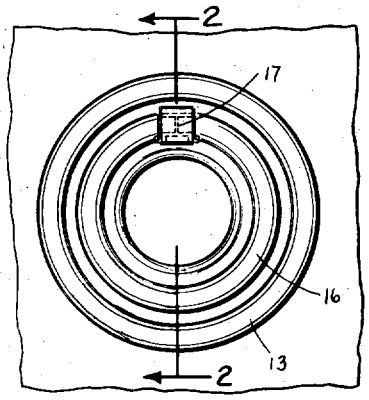
Figure 2:
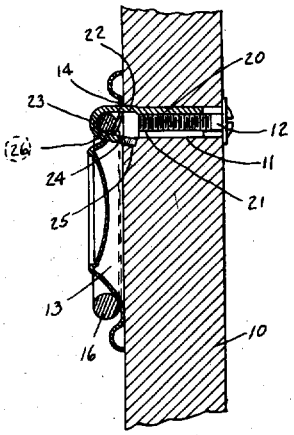
Figure 3:
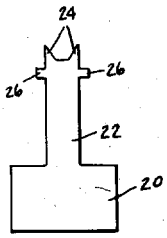
Figure 4:
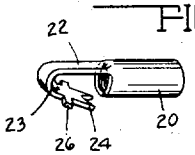
Figure 5:
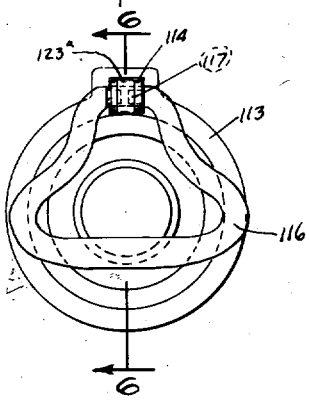
Figure 6:
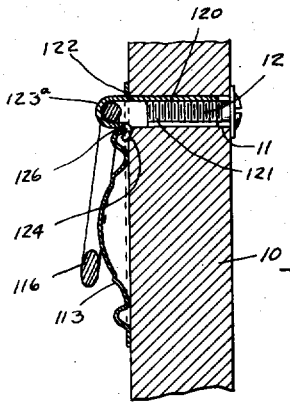
Figure 7:
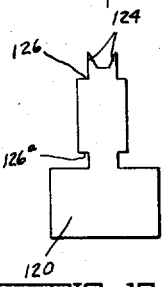
Figure 10:
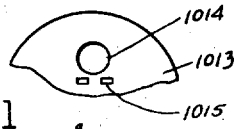
Figure 8:
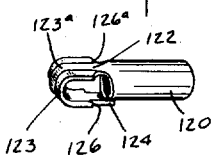
Figure 9:
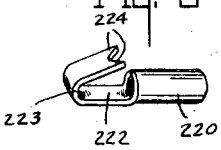
Figure 11:
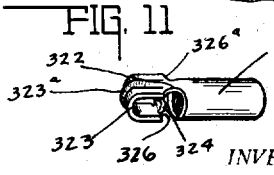

In the drawings, Fig. 1 is a front elevational view of one form of furniture trim of the drawer pull type mounted upon a support. Fig. 2 is a central sectional view taken on line 2—2 of Fig. 1. Fig. 3 is a plan view of the blank from which the combination keeper and mounting is formed prior to formation. Fig. 4 is a perspective view of the combination keeper and mounting in normal formation prior to mounting. Fig. 5 is a front elevational view of a slightly different form of furniture trim. Fig. 6 is a central sectional view taken on line 6—6 of Fig. 5 and in the direction of the arrows. Fig. 7 is a plan view of the blank from which the combination keeper and mounting shown in Figs. 5 and 6 is formed. Fig. 8 is a perspective view of the same. Fig. 9 is a perspective view of a modified and simplest form of the invention. Fig. 10 is a plan view of a portion of a part of the furniture trim prior to associating the keeper and pull therewith. Fig. 11 is a perspective view of a modified form of combination keeper and mounting.

In the drawings 10 indicates a suitable support such as a door panel, or drawer front, or at least including a transverse aperture 11 adapted to receive an anchoring screw bolt 12. Positioned adjacent thereto is an ornamental furniture trim or plate 13 which has the opening 14 therein. A pull handle or loop 16 has the adjacent ends 17 pivotally supported by a single pivot forming member. Herein a single member is adapted to simultaneously mount the handle upon the trim, pivotally support the handle, securely anchor the trim to the support, and cover the parting of the handle portions.

The combination keeper and mounting comprises a tubular body portion 20 interiorly threaded as at 21 and receivable by the transverse opening 11 in the support 10. An extension 22 extends from said body portion substantially parallel to the axis and includes a curved portion 23 which terminates in a barbed end 24. The barbed end 24 is herein shown driven into the support 10 as at 25 and the limit of such anchoring movement is determined by stop means herein shown in the form of lateral extensions 26 from the extension portion 22. Herein a pair of said stops are provided.

As shown clearly in Figs. 3 and 4, the aforesaid combination keeper and mounting comprises a tubular portion 20, an extension 22 curved as at 23, terminating in the barbs 24 and provided with lateral portions, shoulders or stops 26. When the combination keeper and mounting is passed through the opening 14 in the plate 13, after having the handle 16 mounted therein, the tubular body portion is positionable in the transverse opening 11 and by means of the anchoring screw bolt 12 clamping action is secured which serves to rigidly mount the keeper upon the support and in turn rigidly anchor the ornamental plate 13 in position upon said support and simultaneously pivotally support the handle and cover, or otherwise hide the parting 17 of the handle.

In Fig. 6 a modified form of the invention is illustrated, and in this form of the invention the plate portion 113 is slightly dissimilar from the plate portion 13 in outline and ornamentation, but is provided with the opening 114. A handle 116 including the ends 117, is associated therewith and pivotally mounted thereon by means of the mounting. Herein said mounting is shown comprising a tubular body portion 120 interiorly threaded as at 121 to receive the clamping screw 12 carried by the support 10 and positionable in the transverse opening 11. The tubular body includes the extension 122 curved as at 123 to receive the handle portion, cover and protect the same. In the present invention portion 122 is corrugated as at 123[a], and also is shouldered as at 126 and barbed as at 124, which in the present invention is shown as turned angularly of the trim plate 113 for clamping engagement between said shouldered portion 126 and the barbed portion 124. If desired, one or more barbed portions 124 may extend into the support 10, while another barb 124 or additional tongue may extend laterally from the extension and have a clamping engagement with the plate 113. In this event the handle, trim plate and the combination keeper and mounting would be assembled as a unit prior to mounting upon the support. Subsequent clamping action is secured through the medium of the screw 12 and serves to force the barb or barbs into the support 10 and serves to draw the tubular mounting into rigid relation in and upon the support.

In Figs. 7 and 8 the blank and completed combination keeper and mounting is illustrated, and herein the parts are suitably indicated by the same numbers, and in addition the numeral 126[a] indicates a shoulder positioned adjacent the connection of the extension and the tubular body portion. In this form of the invention the shoulders 126[a] and 126 are not formed by lateral projections, but are continuations of each other so that the intermediate extension portion is an enlargement and thus provides material for the corrugated reenforcing portion 123[a]. The corrugation also is ornamental. Shoulders 126 and 126[a] also space the handle from the base.

In Fig. 9 the simplest form of the combination keeper is disclosed, in which the tubular body is indicated by the numeral 220 in the extension 222, curved portion 223 and the barbed end 224. No shoulders are provided and thus limitations of movement in clamping action is not provided for, and thus the handle and keeper can be rigidly clamped to the support.

In Fig. 10 a modified form of ornamental plate is illustrated, and in this form of the invention the plate 1013 has the central opening 1014 and one or more barb receiving openings 1015 independent of the opening 1014. In this form of the invention turning or twisting of the plate about its support is positively prevented although generally, the aforesaid construction or arrangement of the trim plate is not required. The apertures 1015, of course, receive the barbs 24, 124 and 224, as the case may be, while the central aperture receives the central body portion 20, 120 or 220.

In Fig. 11 another modified form of the invention is illustrated in which 320 indicates the tubular body portion or anchorage, 322 the longitudinal extension therefrom, 323 the curvature in the longitudinal extension, 323[a] the longitudinal corrugation therein, 324 an end which is herein shown extending angularly of the extension 322 adjacent the shoulders 326. In this form of the invention the end 324 forms an encircling extension that practically completes the circular bearing for the handle 16 or 116. If desired shoulders 326 shown in Fig. 11 may be extended to form the barbs shown in the other figures. In this case the blank will be formed by slotting longitudinally a full blank shown in Fig. 7 instead of forming the projecting portions as indicated in said figures.

While in all the figures the combination mounting and keeper is shown positioned with its longitudinal opening or slit in the lower portion when mounted, the mounting may be inverted and in this instance, see Fig. 10, the openings 1015 will be positioned above the opening 1014 instead of beneath the same as illustrated in said figure.

The invention claimed is:

1. A combination keeper and mounting, comprising a tubular body, and an extension from said body in alignment with the tubular portion, said extension having its end arranged in tubular formation such that the free end terminates adjacent the tubular body and forms a tubular portion communicating with the tubular body, the axes of the tubular body and the tubular portion intersecting and being substantially transverse to each other.

2. A combination keeper and mounting, comprising a tubular body, an extension from said body in alignment with the tubular portion, said extension having its end arranged in tubular formation such that the free end terminates adjacent the tubular body and forms a tubular portion communicating with the tubular body, the axes of the tubular body and the tubular portion intersecting and being substantially transverse to each other, and an anchoring portion on the free end of the extension and positionable adjacent said body for anchorage.

3. A combination keeper and mounting, comprising a tubular body, an extension from said body in alignment with the tubular portion, said extension having its end arranged in tubular formation such that the free end terminates adjacent the tubular body and forms a tubular portion communicating with the tubular body, the axes of the tubular body and the tubular portion intersecting and being substantially transverse to each other, and a stop on the extension adjacent the end thereof and positionable adjacent said body.

4. A combination keeper and mounting, comprising a tubular body, an extension from said body in alignment with the tubular portion, said extension having its end arranged in tubular formation such that the free end terminates adjacent the tubular body and forms a tubular portion communicating with the tubular body, the axes of the tubular body and the tubular portion intersecting and being substantially transverse to each other, an anchoring portion on the free end of the extension and positionable adjacent said body for anchorage, and a stop on the extension adjacent the end thereof and positionable adjacent said body.

In witness whereof, we have hereunto affixed our signatures.

WILLIAM H. NOELTING.
ANDREW I. BROKAW.